(12) United States Patent
Moeller et al.

(10) Patent No.: US 7,735,027 B2
(45) Date of Patent: Jun. 8, 2010

(54) ALIGNMENT OF PRODUCT REPRESENTATIONS

(75) Inventors: Thomas F. Moeller, Weilerswist (DE); Eric M. Leeson, Mason, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1005 days.

(21) Appl. No.: 11/482,533

(22) Filed: Jul. 7, 2006

(65) Prior Publication Data

US 2008/0010620 A1 Jan. 10, 2008

(51) Int. Cl.
*G06F 17/50* (2006.01)
(52) U.S. Cl. .......................................................... 716/1
(58) Field of Classification Search ....................... 716/1
See application file for complete search history.

(56) References Cited

U.S. PATENT DOCUMENTS

| | | | | |
|---|---|---|---|---|
| 5,434,794 | A | * 7/1995 | Coudert et al. | 716/2 |
| 2002/0143754 | A1 | * 10/2002 | Paulley et al. | 707/3 |
| 2002/0169587 | A1 | * 11/2002 | Emek et al. | 703/2 |
| 2007/0074152 | A1 | * 3/2007 | Roe | 717/104 |
| 2007/0250331 | A1 | * 10/2007 | Liu et al. | 705/1 |
| 2009/0076837 | A1 | * 3/2009 | Collier | 705/1 |

* cited by examiner

*Primary Examiner*—Jack Chiang
*Assistant Examiner*—Suchin Parihar
(74) *Attorney, Agent, or Firm*—Michael J. Wallace, Jr.

(57) ABSTRACT

A system, method, and computer program for identifying a plurality of product representations; formulating a plurality of logical expressions from said plurality of product representations; and aligning each of said plurality of logical expressions with a variance completeness and a consistency and appropriate means and computer-readable instructions.

15 Claims, 11 Drawing Sheets

ALIGNMENT OF PRODUCT REPRESENTATIONS

TECHNICAL FIELD

This invention relates generally to product representation solutions. More specifically, the invention relates to a system and method of aligning CAD occurrences to business part usages.

BACKGROUND

The computer has greatly affected essentially all forms of information management, including the process of managing the entire lifecycle of a product from its conception, through design and manufacture to service and disposal. The term for this process is Product Lifecycle Management, or PLM. It is a cornerstone of a corporation's IT digital structure. One of the features of PLM is to collect knowledge that can be reused for other projects and to coordinate simultaneous concurrent development of many products. PLM can also include the coordination of and management of product definition data, including configuring product variations. The management of product definition data involves managing that product's bill of materials. The bill of materials, or BOM, describes the product in a tabular format and in terms of its assemblies, sub-assemblies, and basic components and parts. The BOM is a subset of a larger bill of information concept which can enumerate information, e.g., related to a product or a process, and provide sufficient information as it is designed, manufactured, ordered, built, maintained, and/or processed.

Referring to product design and development, when a product is designed as a generic product family, it has to be configured to a specific product variant or product variant family for almost every business process throughout the entire product life cycle. Every manufactured product instance, every physical or digital prototype, every analysis or simulation, is based on a specific product variant configuration. Throughout the product development process various disciplines produce generic product representations that model the product as a generic product family, which can be configured to a specific product variant or product variant family. However, each discipline, e.g. part BOM, CAD, or Manufacturing Engineering, uses different product representations with different level of detail with regards to variant configuration.

A part BOM usually creates variant configuration data specifying all product variants necessary for a given part usage. CAD requires additional variant data that specifies position and deformation (e.g., of a hose) of the geometry representing a given part usage in the part BOM. Manufacturing Engineering needs even more variant data, e.g., specifying the assembly process of the specific position and shape in a given part usage. For example, a robot may need to deform and position a flexible hose in many different ways, depending on product components that may cross the robot path.

Generally speaking, it is expected that, while all disciplines work with the same product variability (the set of available variant features) the domain specific product representation will contain only variance (variant condition) information that is relevant for the specific domain. In order to fully align each of these product representations in terms of variance completeness (congruent product representations) and consistency (assert non-empty intersection between domain specific variances) it is important to establish a mapping between these product representations.

The growing complexity of product configurations has made it very difficult to determine whether instances were mapped between two product representations, e.g., CAD structure and part BOM. There is a need for a solution for determining whether the instances that are mapped between different product representations completely align or show mismatches.

SUMMARY

To achieve the foregoing, and in accordance with the purpose of the presently preferred embodiment as broadly described herein, the present application provides a method comprising the steps of identifying a plurality of product representations; formulating a plurality of logical expressions from said plurality of product representations; and aligning each of said plurality of logical expressions with a variance completeness and a consistency. The method, wherein said plurality of product representations comprises a plurality of variant condition information corresponding to a particular domain. The method, wherein said variance completeness is a congruent product representation. The method, wherein said consistency is a non-empty intersection among a plurality of domain specific variances.

An advantage of the presently preferred embodiment is to provide a method comprising the steps of intersecting a plurality of variant expressions of a domain specific solution; formulating a plurality of sub-expressions from the use of a plurality of bit arrays that represent a plurality of prime implicants of said intersection and a linked solution; and linking between said domain specific solutions by said sub-expression for a same component in at least one different product representation.

Another advantage of the presently preferred embodiment is to provide a method comprising the steps of linking a plurality of domain solutions having a plurality of logical expressions from a component with a plurality of product representations; intersecting said logical expressions to form a plurality of sub-expressions, wherein said sub-expressions map to said domain solutions; and determining an equivalence using bit arrays that represent the prime implicants of said intersection and said domain solutions whereby said equivalence indicates alignment of said product representations.

And another advantage of the presently preferred embodiment is to provide a computer-program product tangibly embodied in a machine readable medium to perform a method, comprising instructions for identifying a plurality of product representations; instructions for formulating a plurality of logical expressions from said plurality of product representations; and instructions for aligning each of said plurality of logical expressions with a variance completeness and a consistency. The computer-program product, wherein said plurality of product representations comprises a plurality of variant condition information corresponding to a particular domain. The computer-program product, wherein said variance completeness is a congruent product representation. The computer-program product, wherein said consistency is a non-empty intersection among a plurality of domain specific variances.

Yet another advantage of the presently preferred embodiment is to provide a computer-program product tangibly embodied in a machine readable medium to perform a method, comprising instructions for intersecting a plurality of variant expressions of a domain specific solution; instructions for formulating a plurality of sub-expressions from the use of a plurality of bit arrays that represent a plurality of prime implicants of said intersection and a linked solution; and instructions for linking between said domain specific solutions by said sub-expression for a same component in at least one different product representation.

And yet another advantage of the presently preferred embodiment is to provide a computer-program product tangibly embodied in a machine readable medium to perform a method, comprising instructions for linking a plurality of domain solutions having a plurality of logical expressions from a component with a plurality of product representations; instructions for intersecting said logical expressions to form a plurality of sub-expressions, wherein said sub-expressions map to said domain solutions; and instructions for determining an equivalence using bit arrays that represent the prime implicants of said intersection and said domain solutions whereby said equivalence indicates alignment of said product representations.

Still another advantage of the presently preferred embodiment is to provide a data processing system having at least a processor and accessible memory to implement a method to determine an alignment of product representations, comprising means for identifying a plurality of product representations; means for formulating a plurality of logical expressions from said plurality of product representations; and means for aligning each of said plurality of logical expressions with a variance completeness and a consistency.

And still another advantage of the presently preferred embodiment is to provide a data processing system having at least a processor and accessible memory to implement a method to determine an alignment of product representations, comprising means for intersecting a plurality of variant expressions of a domain specific solution; means for formulating a plurality of sub-expressions from the use of a plurality of bit arrays that represent a plurality of prime implicants of said intersection and a linked solution; and means for linking between said domain specific solutions by said sub-expression for a same component in at least one different product representation.

And still yet another advantage of the presently preferred embodiment is to provide a data processing system having at least a processor and accessible memory to implement a method to determine an alignment of product representations, comprising: means for linking a plurality of domain solutions having a plurality of logical expressions from a component with a plurality of product representations; means for intersecting said logical expressions to form a plurality of sub-expressions, wherein said sub-expressions map to said domain solutions; and means for determining an equivalence using bit arrays that represent the prime implicants of said intersection and said domain solutions.

Computer-Program Product.

Another advantage of the presently preferred embodiment is to provide a data processing system.

Still another advantage of the presently preferred embodiment is to provide a.

Other advantages of the presently preferred embodiment will be set forth in part in the description and in the drawings that follow, and, in part will be learned by practice of the invention.

The presently preferred embodiment will now be described with reference made to the following Figures that form a part hereof. It is understood that other embodiments may be utilized and changes may be made without departing from the scope of the present invention.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 1:
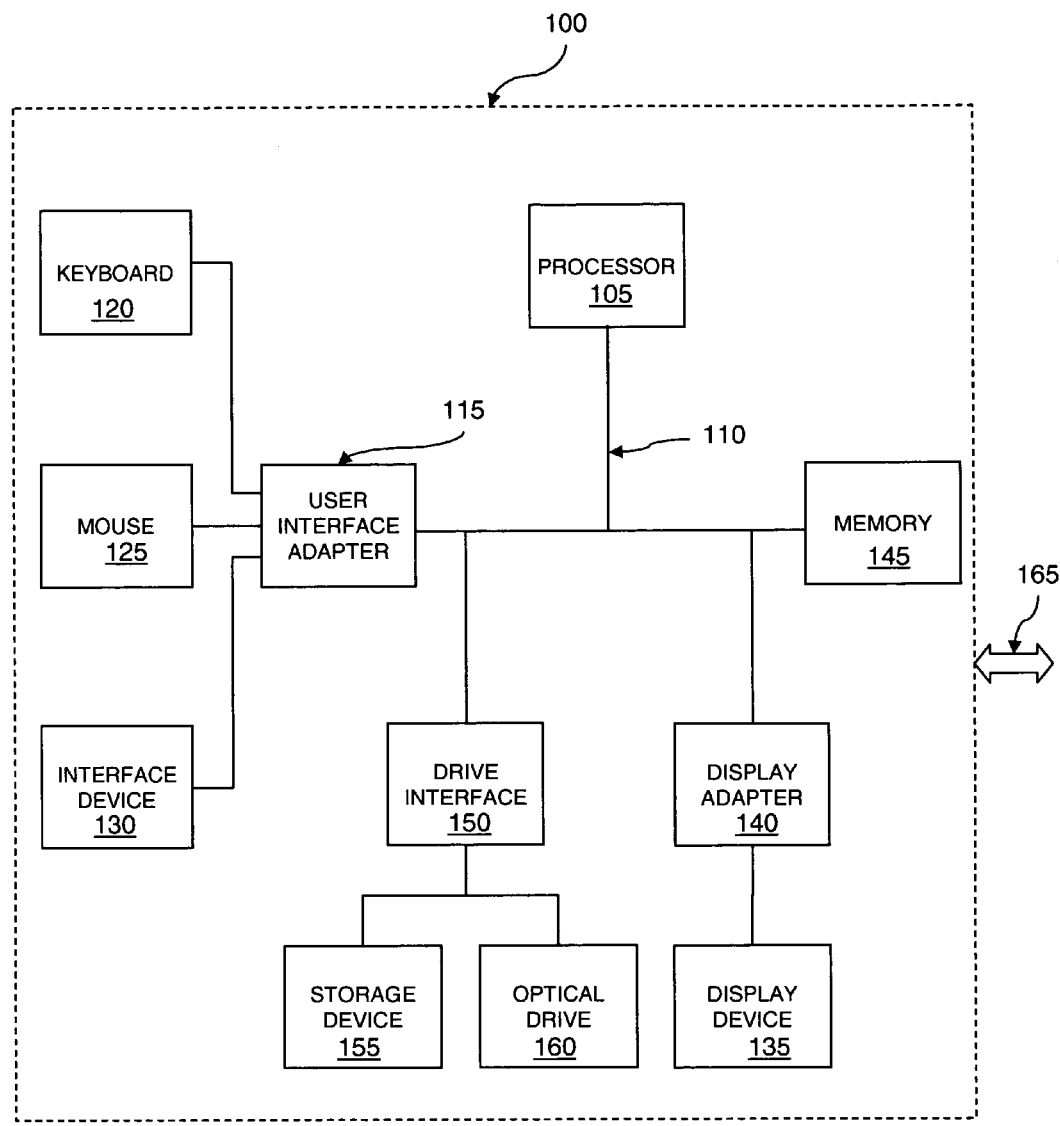
FIG. 1 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method of aligning a product representation. Now therefore, in accordance with the presently preferred embodiment, an operating system executes on a computer, such as a general-purpose personal computer. FIG. 1 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

With reference to FIG. 1, an exemplary system for implementing the presently preferred embodiment includes a general-purpose computing device in the form of a computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The bus 110 may be any of several types of bus structures including a memory bus or memory controller, a peripheral bus, and a local bus using any of a variety of bus architectures. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to a memory 145, which can include ROM, RAM, etc.

The computer 100 further includes a drive interface 150 that couples at least one storage device 155 and/or at least one optical drive 160 to the bus. The storage device 155 can include a hard disk drive, not shown, for reading and writing to a disk, a magnetic disk drive, not shown, for reading from or writing to a removable magnetic disk drive. Likewise the optical drive 160 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 100.

The computer 100 can communicate via a communications channel 165 with other computers or networks of computers. The computer 100 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Figure 2:
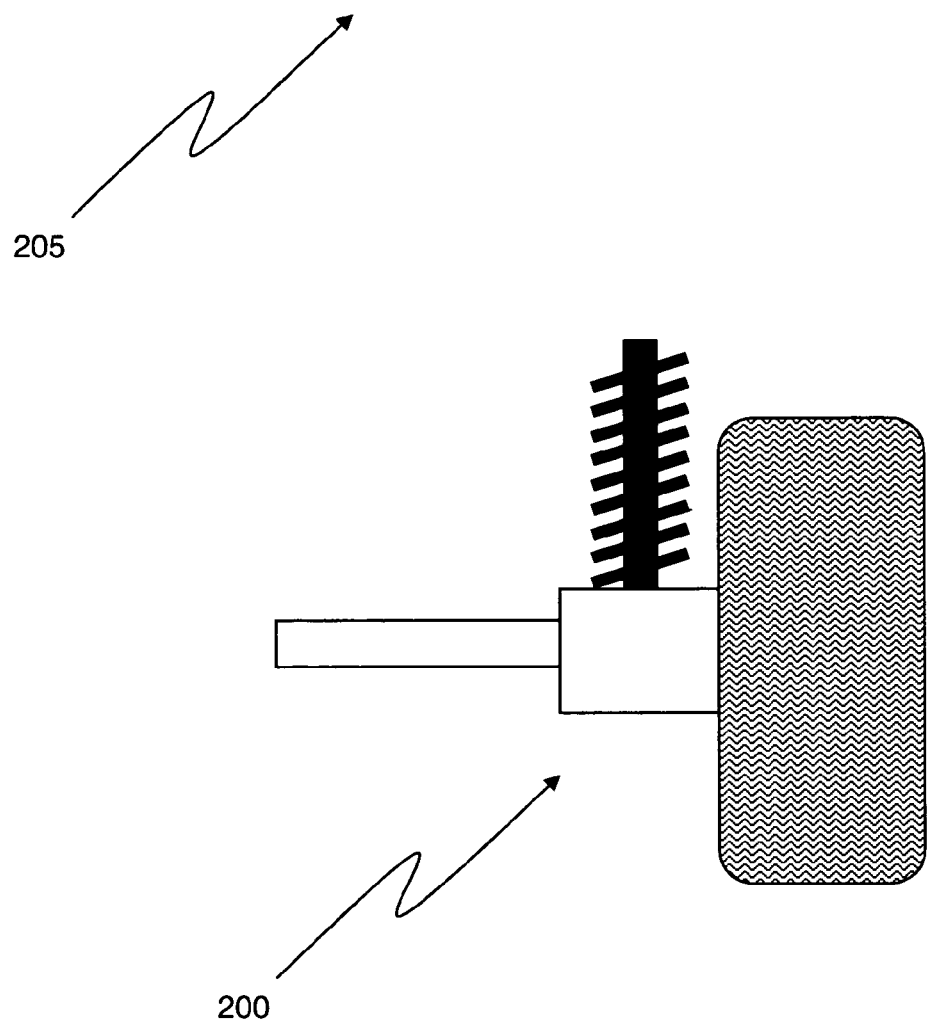
FIG. 2. is a partial bill of material with a corresponding product.

Referring to FIG. 2, a partial bill of material with a corresponding product. As shown in FIG. 2, a content and a structure of a product 200 is described in a bill of material (BOM) 205 that lists a series of components 210 comprising the product 200. Each element of the BOM 205 describes a unique usage of a specific quantity of the components 210 in what is called a line of usage (LOU) 215. A boolean expression associated with the LOU 215 defines a variant condition under which the product 200 uses the component 210 with the quantity specified in the LOU 215, where the boolean expression combines one or more available product features or variant options. This boolean expression is called a usage condition.

Minimization Technique

Figure 3:
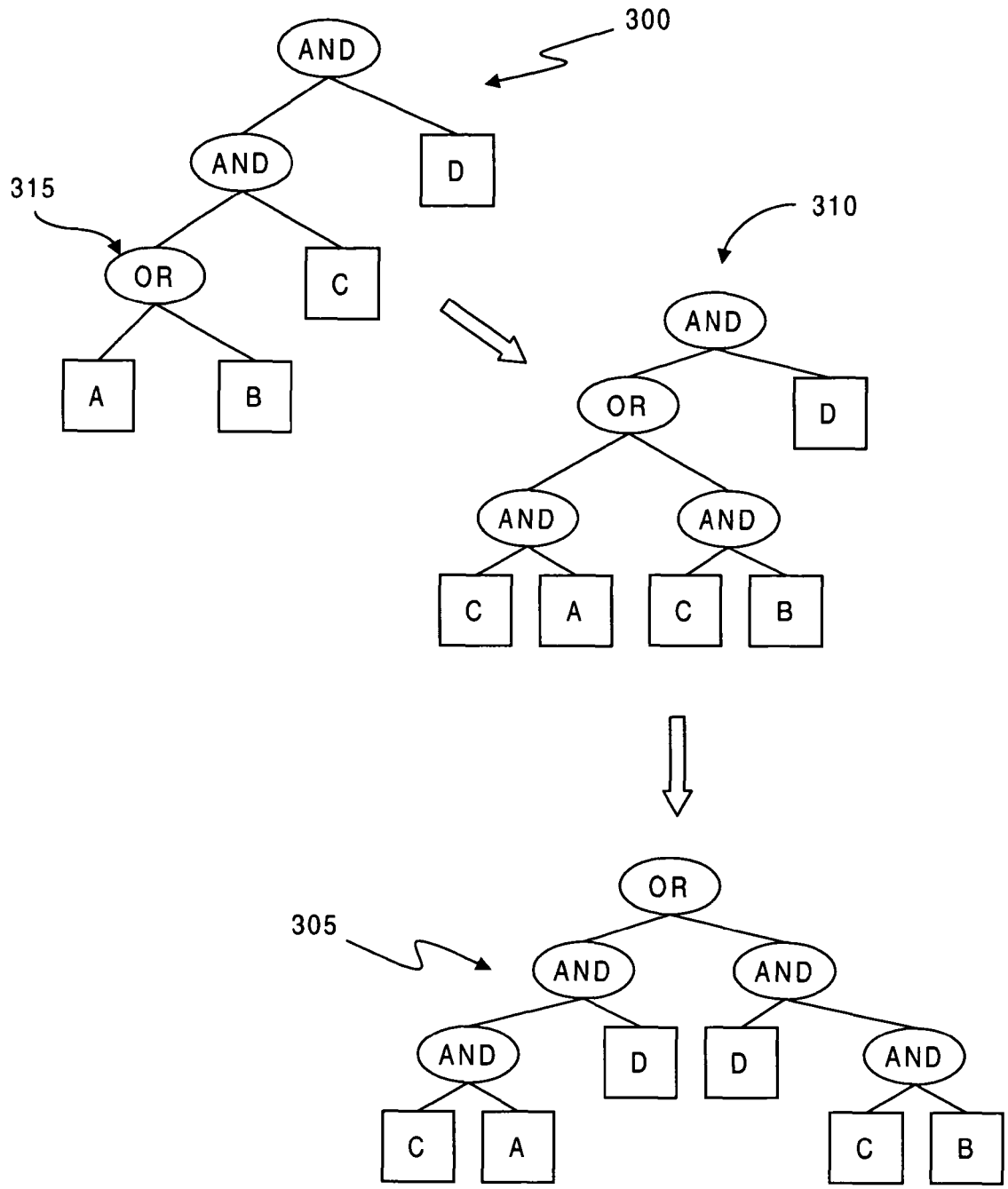
FIG. 3 illustrates a process of transforming a binary tree boolean expression into a normal form.

Referring to FIG. 3, a process of transforming a binary tree boolean expression into a normal form. As shown in FIG. 3, the usage condition, for example (( A OR B) AND C ) AND D) shown as a binary tree 300, can be converted into a DNF 305 by moving AND-nodes 310 down and OR-nodes 315 up. The usage condition is expressed in Disjunctive Normal Form (DNF), if it consists of a disjunction of conjunctions where no conjunction contains a disjunction, e.g., (a AND b) OR (b AND c) in pedantic notation. In Polish Notation, the DNF has the following form: $OR(t_1, t_2, \ldots, t_n)$, where all terms $t_1 \ldots t_n$ have the form $AND(l_1, l_2, \ldots, l_n)$. $L_1 \ldots l_n$ are literals each representing a single boolean variable, e.g., "color EQUAL green", or "NOT size EQUAL large."

The AND-nodes that need to be moved down can be found by searching the binary tree for any AND-nodes having an OR-node as a child. The search can be implemented as a recursive function beginning at the top. If the search processes a node before processing its child, and if matching AND-nodes are appended to the end of a result tree, the final result tree will list all AND-nodes to be moved down in reverse order in which they need to be processed. The aforementioned process of recursively traversing a binary tree is well-known to those skilled in the art and will not be addressed with further detail.

Figure 4:
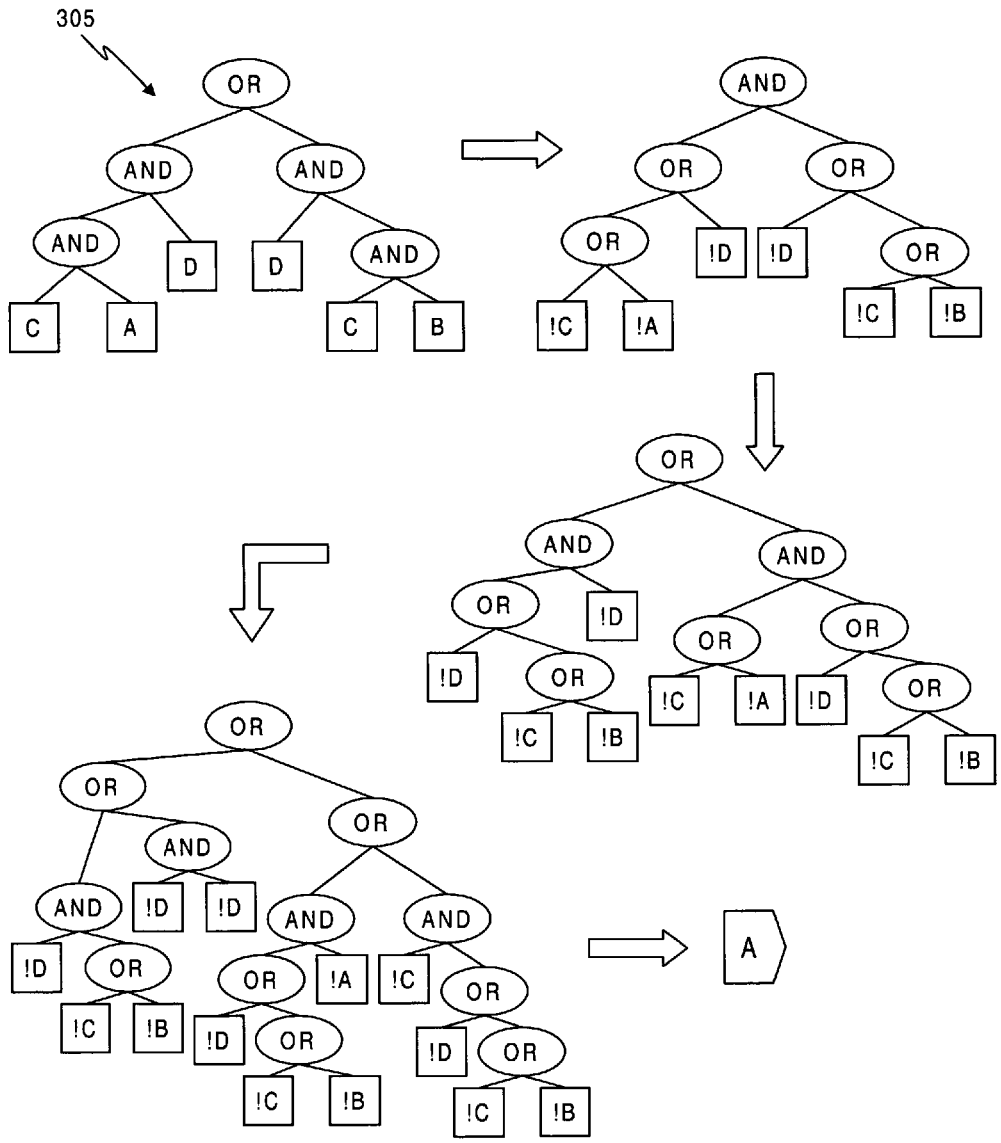
FIG. 4 illustrates a portion of a process to convert binary tree boolean expression into a normal form.
Figure 5:
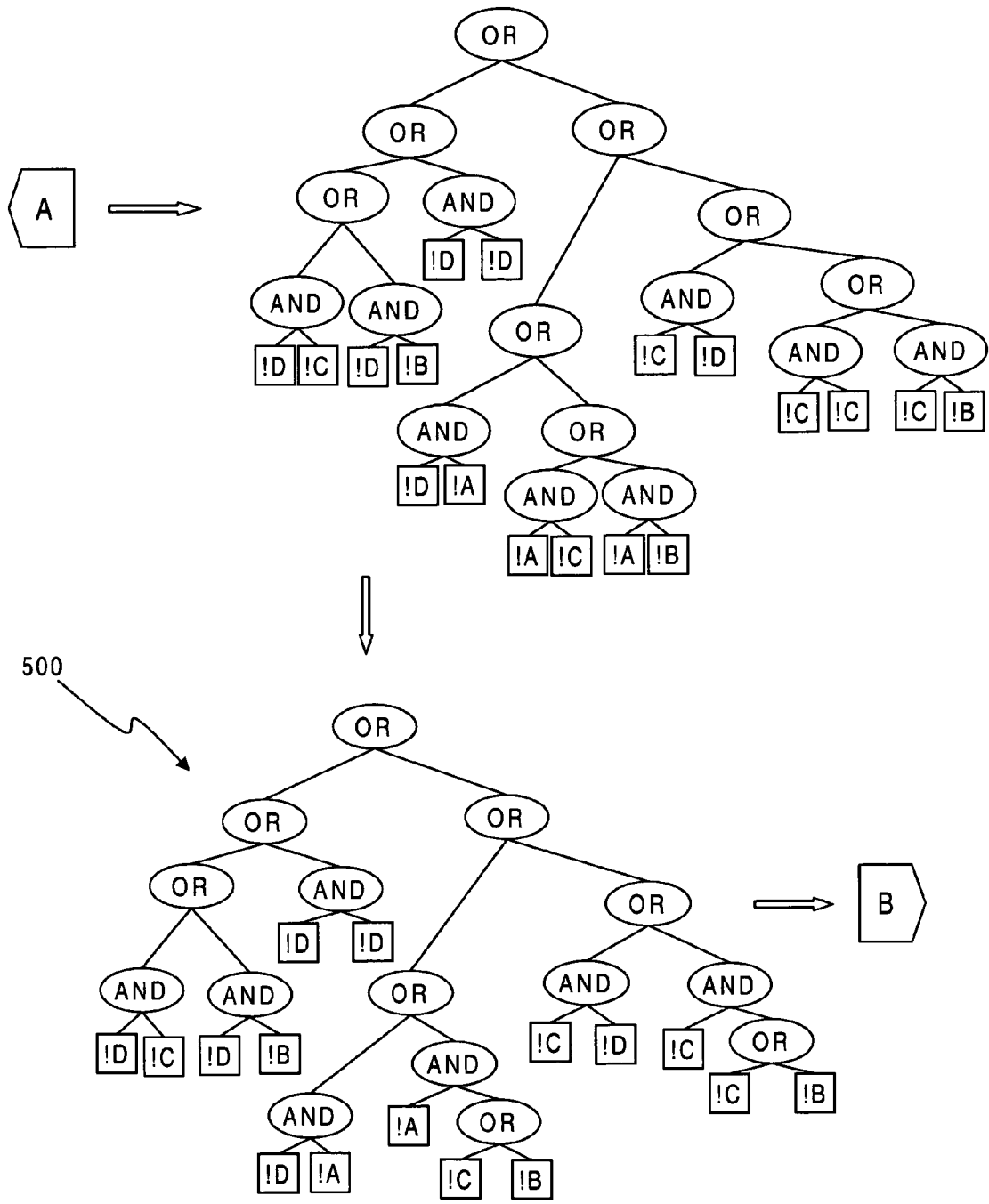
FIG. 5 illustrates a portion of a process to convert binary tree boolean expression into a normal form.
Figure 6:
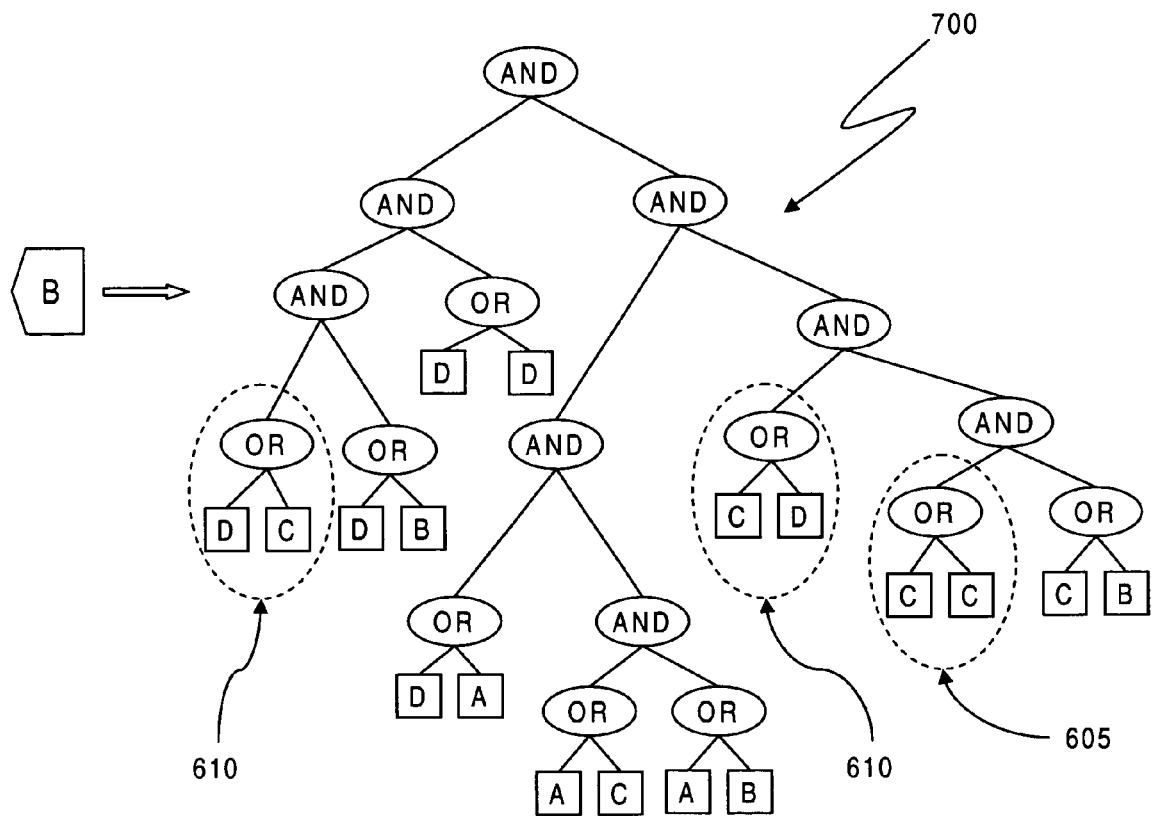
FIG. 6 illustrates a portion of a process convert binary tree boolean expression into a normal form.

Referring to FIGS. 4-6, illustrates the steps to convert a logical formula expression into its DNF equivalent by application of De Morgan's Law and distribution laws in elementary logic. It is important to note that DNF is generous with operators while very strict about nesting: a single level of disjunction and a single level of conjunction within each disjunct. Accordingly, upon reaching a single level of nesting 500 and converting the DNF to the CNF form by creating the negated expression, it quickly becomes apparent that the process may produce a normal form 600 with redundant or duplicate elements, like a duplicate literal 605 or a duplicate term 610, for example. With these elements, it is important to simplify the DNF and the therefore the resulting CNF which it is based upon.

Figure 7:
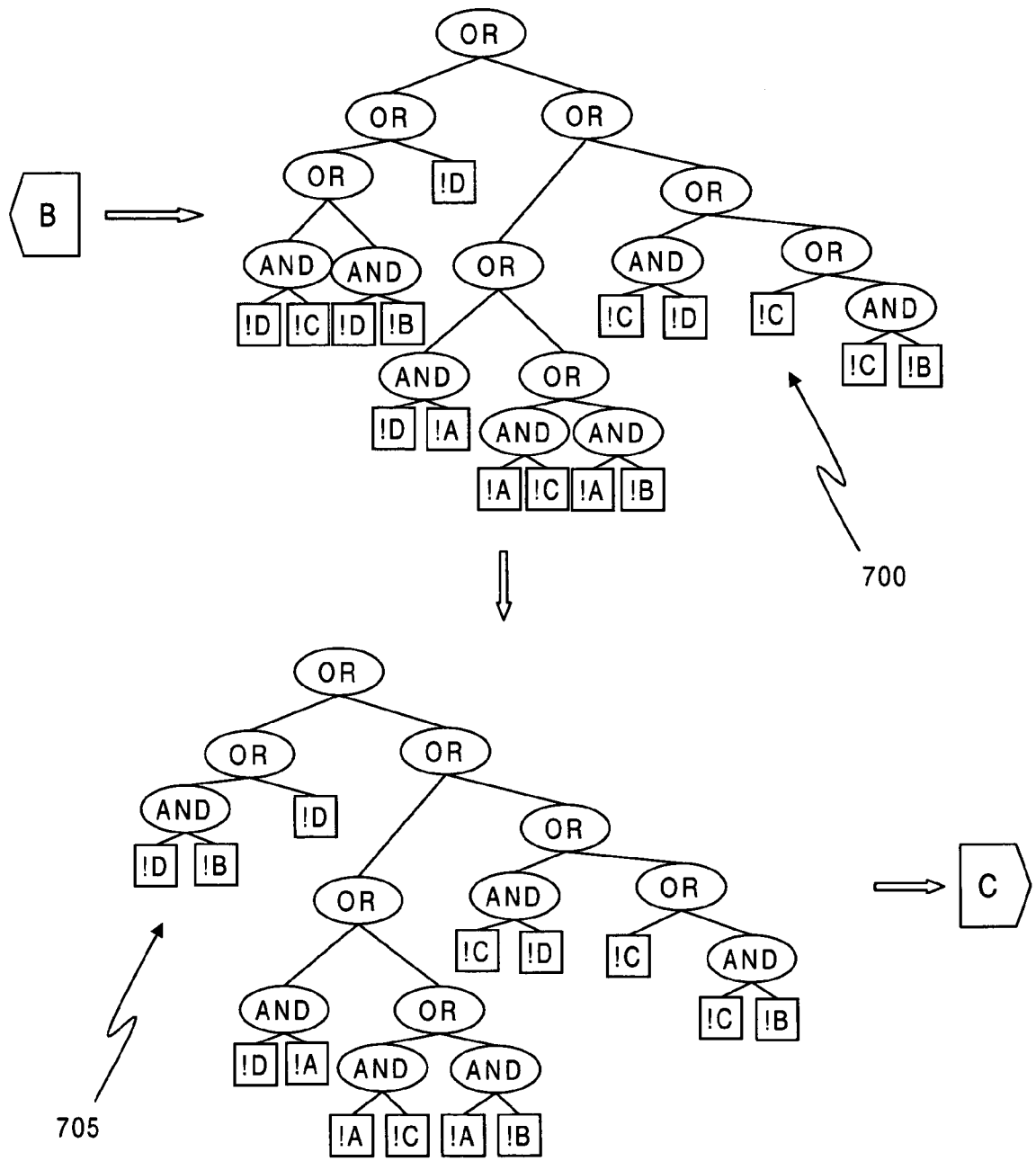
FIG. 7 illustrates a portion of a process to simplify a normal form.
Figure 8:
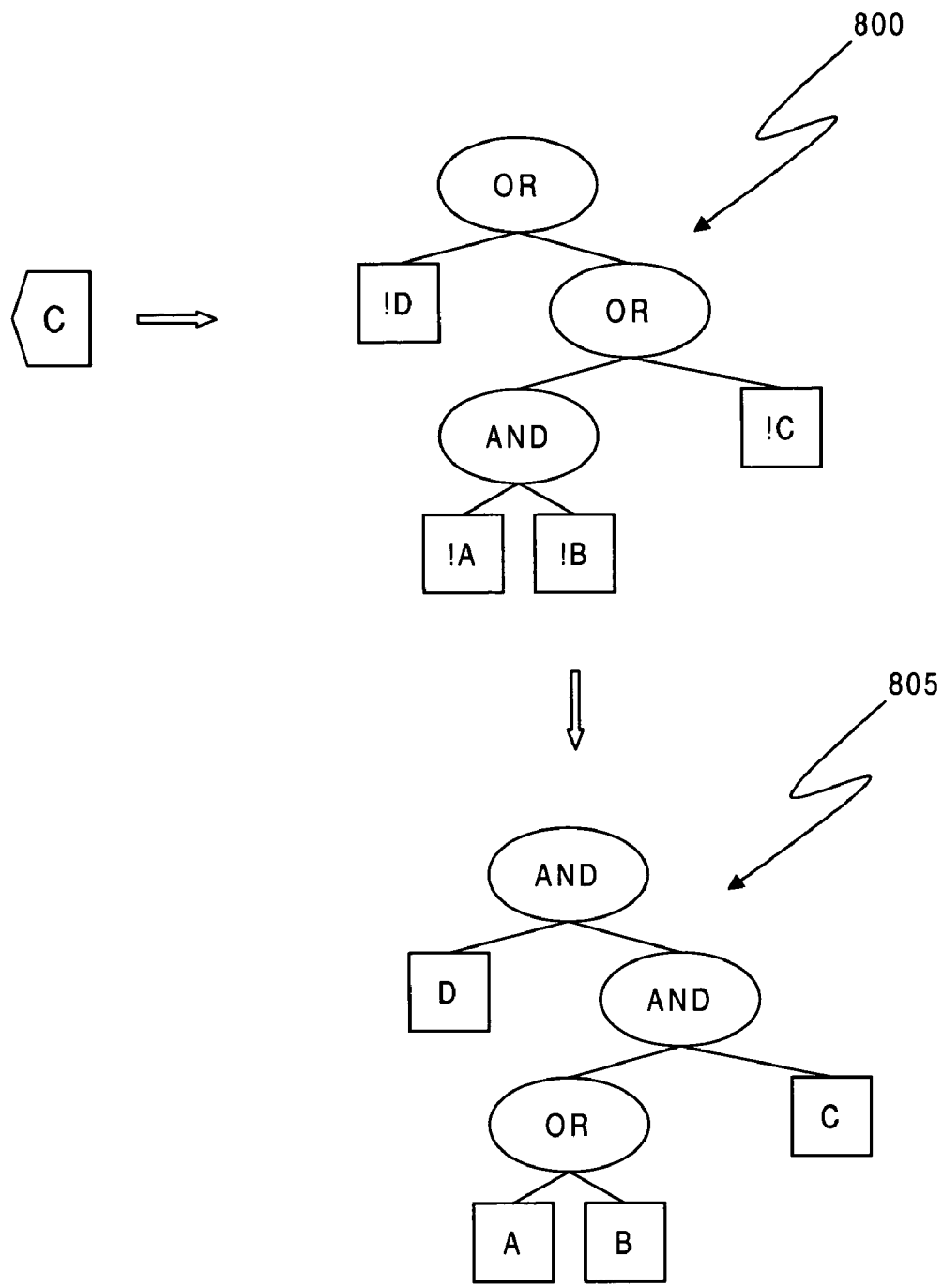
FIG. 8 illustrates a portion of a process to simplify a normal form.

Referring to FIGS. 7 & 8, illustrating a portion of a process to simplify a normal form. As shown in FIGS. 7 & 8, simplifying the DNF is important for increased performance returning to the single level of nesting 500, continue with eliminating any of the duplicate literals 605, generally illustrated at 700. Next, eliminate irrelevant terms, i.e., those terms that contain complementary (e.g., a AND !a) or otherwise unsatisfiable literals ("length GREATER 10 m AND length LESS 8 m"). After that, the duplicate terms 610 are removed, generally illustrated at 705. Next, irrelevant literals are removed according to an implementation of the Theorem of Consensus, a well known technique to simplify boolean logic, and also take into consideration a set of dependency rules. Following the implementation of the Theorem of Consensus, eliminate a term $t_i$ with literals $l_i$, if a term $t_j$ with literals $l_j$ exists where $l_i$ and $l_j$ are identical sets with the exception of a single literal $l_{ii}$ and $l_{jj}$ in each set where $l_{ii}$=NOT $l_{jj}$. It is important to test whether $l_{ii}$ OR $l_{jj}$=TRUE, which is always the case if $(l_{ii})$==NOT $(l_{jj})$. Alternatively, it is also TRUE in other cases like LENGTH>5 OR LENGTH<10, where the two literals are $l_{ii}$:=LENGTH>5 and $l_{jj}$:=LENGTH<10 that is equivalent to $(l_{ii})$ !=NOT $(l_{jj})$ while the following $l_{ii}$ OR $l_{jj}$=TRUE is valid. The two terms containing $l_{ii}$ and $l_{jj}$ can be simplified based on the Theorem of Consensus that provides more checks to simplify when starting with a full minterm table where it is sufficient to only check for an overlap of one single literal.

If such a term $t_i$ exists, it can be eliminated after the literal $l_{jj}$ is removed from term $t_j$. If eliminating a literal empties term $t_i$, the expression is always false. If at least one literal was removed from some term in this step, the simplification may repeat the prior step. Continuing, if for each literal $l_i$ in term $t_i$ another term $t_j$ exists that contains a literal $l_j$=NOT $l_i$, the expression is always false. And finally, eliminate term $t_i$ if its set of literals $l_i$ fully includes the set of literals $l_j$ of another term $t_j$ as generally illustrated at 800.

The usage condition in the simplified DNF form is converted into its corresponding CNF form of ((a OR b) AND c) AND d, generally illustrated at 805. Note that the final logical expression is the same as the beginning logical expression, which illustrates that nothing is lost in the translation into normal form and subsequent minimization. In practice, however, logical expressions are more realistically hundreds of lines long with thousands of literals. Following the techniques disclosed in the preferred embodiment, the resulting logical expression of prime implicants is a fraction the length, for example 20 lines, that directly improves computability and therefore performance.

The simplified form represents the Boolean condition as a list of clauses ($c_1 \ldots c_n$) combined through an AND operator, where each clause contains one or more option literals ($l_1 \ldots l_n$) that are combined through an OR operator. The literals may come in one of two forms: "featurefamily EQUAL value" and "NOT featurefamily EQUAL value." Feature and featurefamily are used interchangeably for features that are not a member of any feature family, i.e., they are standalone features. Standalone features always have two values indicating whether the feature is selected or not, e.g., on/off, yes/no, present/absent, etc. Should the literal be an inequality literal, e.g., length LESS THAN 10 m, it persists as the list of enumerated feature literals that satisfy this expression, e.g., "OR (length EQUAL 8 m, length EQUAL 9.8 m, . . . , length EQUAL 1 m)," and using the list of features that has been made available on the product via the product variability. Accordingly, usage conditions that contain inequality literals need to be expanded again into the applicable enumerated features if a new value is added to the product variability for one of the feature families of the usage conditions references.

XO Tables in PCN

A boolean expression in disjunctive normal form can be stored as a table where each row represents a product term of the expression, that is reduced to contain only prime implicants according to the minimization techniques previously discussed. Each cell is represented by a bit pattern of two bits. 4 cells can therefore be stored in an 8-bit byte. The 2 bits, having four different states (0, 1, 2, & 3) are used to encode the following, as illustrated in Table 1.

TABLE 1

States of a Cell

| | |
|---|---|
| 00 | Unset, as illustrated by a "—" |
| 01 | The expression in the column header is a literal in the product term that is represented by the this row, as illustrated by a "X" |
| 10 | The expression in the column header is the negation of a literal in the product term that is represented by the this row, as illustrated by a "O" |
| 11 | Not used, and if found it indicates an error. |

The above encoding is equivalent to the Positional Cube Notation (PCN) where 1 is equivalent to X, 0 is equivalent to O and "Don't care" is equivalent to "–". The first 8 bit byte is reserved for flags. For now 3 flags are used, as illustrated in Table 2.

TABLE 2

Flag Definitions

| | |
|---|---|
| 00000001 | Indicates the first row (or Prime Implicant) of a new expression |
| 00000010 | Indicates TRUE, a universally true Prime Implicant. Since this must be the only Prime Implicant of the expression, this bit pattern will always come together with 00000001, i.e. a line starting with 00000011 [(byte & 7) == 3] is equivalent to the Prime Implicant (and therefore expression) of TRUE |
| 00000100 | Indicates FALSE, an unsatisfiable Prime Implicant. Since this must be the only Prime Implicant of the expression, this bit pattern will always come together with 00000001, i.e. a line starting with 00000101 [(byte & 7) == 5] is equivalent to the Prime Implicant (and therefore expression) of FALSE |

In order to normalize XO tables it is necessary to sort rows and columns. Two expressions that are logically equivalent, e.g. "O1=V1 AND O2=V2" and "O2=V2 AND O1=V1" have identical normalized XO tables. The XO table that correspond to a given expression can therefore be used to check logical equivalence with other expressions. In addition the XO table can be used to calculate a checksum, or fingerprint, that represents the Boolean content of an expression.

Matching Algorithm

The preferred embodiment teaches the disclosed algorithm to determine whether logical expressions are equivalent. That determination will be used to determine whether existing links should be re-used for additional mappings. If no links exist, then the preferred embodiment determines the minimum set of new links to create. Put another way, the preferred embodiment determines which sub-expressions $C_{I_i}$ are necessary to link two domain solutions, e.g., a positioned CAD design ("CAD occurrence") and a part usage, or "Line of Usage." The presently preferred embodiment is described with a perspective of linking the CAD occurrence to the part solutions, but it is symmetrical and can also be used to link a part usage to a CAD occurrence. Likewise, the presently preferred embodiment can be used to map any domain solutions to one another, for example, aligning manufacturing to part, or vice versa.

Figure 9:
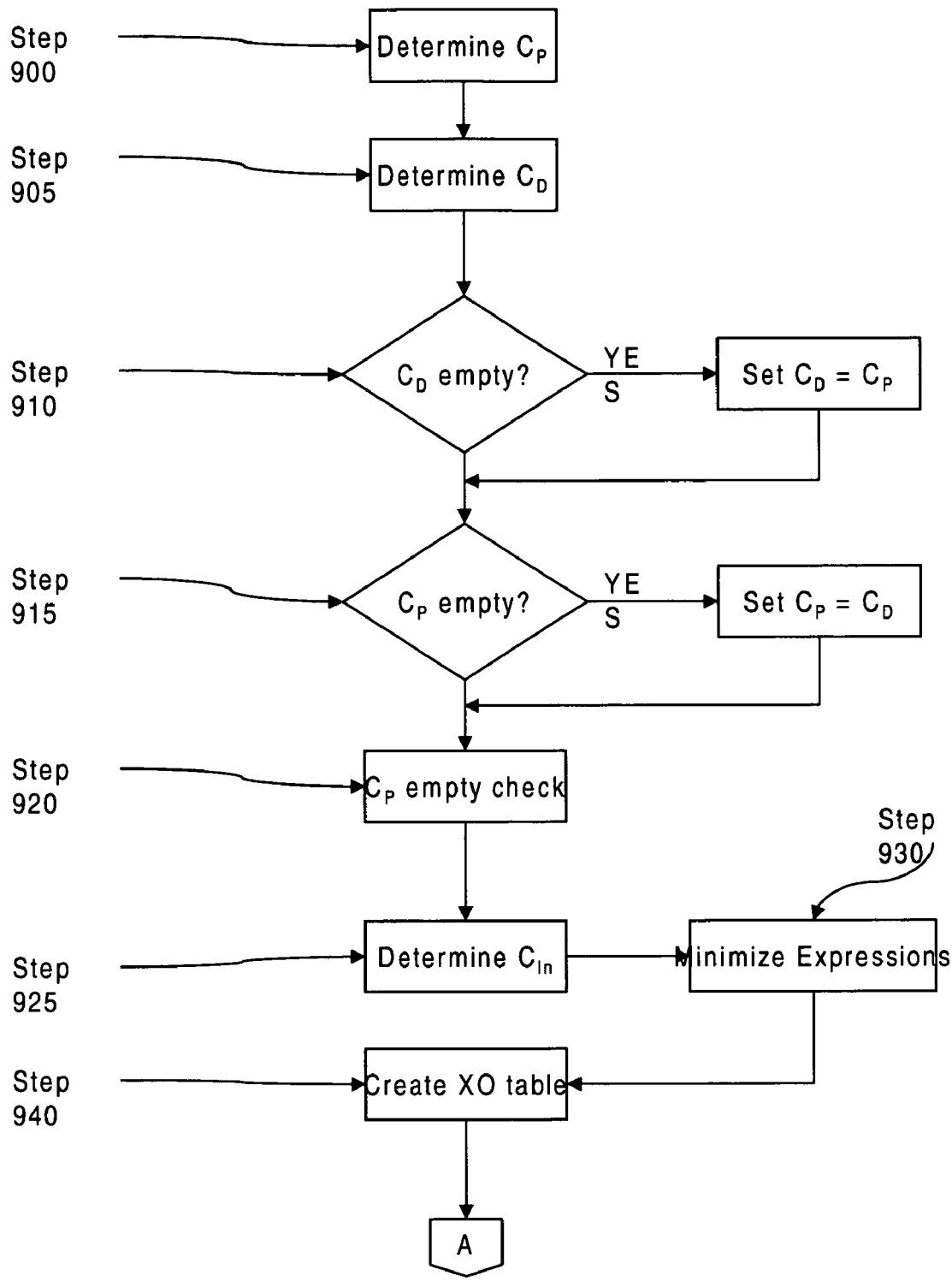
FIG. 9 is a flow chart of a matching algorithm as disclosed in the preferred embodiment.

Referring to FIG. 9, a flow chart of the matching algorithm that begins with determining the part usage condition $C_P$ (Step 900). If the part usage conditions are expressed relative to a parent assembly and not in absolute product terms, part usage conditions need to be rolled up (combined with "AND") to the product level. Next, determine the effective CAD occurrence condition $C_D$ in product terms (Step 905). This is the product ("AND" combination) of all CAD variant conditions along the ancestor tree in the CAD structure. If $C_D$ is empty, set $C_D=C_P$ (Step 910). If $C_P$ is empty, set $C_P=C_D$ (Step 915). If $C_P$ is still empty, there is an error and the preferred embodiment can do one of two things, it can conclude that there is a single sub-expression "$C_{I_i}$=True" and map the CAD occurrence and the part usage to it, or it may error out as per the user's need. It is possible to attach a variant condition that explicitly indicates "True", e.g., "Feature=Value OR Feature !=Value," if it is indeed desired to use both solutions without any variant expression at all. And finally, determine the set of existing sub-expressions $C_{I_n}$ that are already linked to the part usage (Step 925).

Create a table XO in Positional Cube Notation (PCN, see XO Table below) that contains the following prime implicants of $C_{I_n}$ (Step 930), minimized according to the techniques described above (each expression C may have more than one prime implicant and may therefore span over more than one row in XO—see XO Table below). The index indicated in XO[index] points to the first row of expression index in table XO. Each row in XO represents one prime implicant of the corresponding expression:

XO Table

| | |
|---|---|
| 0 | XO[0] = $C_P$ |
| 1 | XO[1] = $C_D * C_P$ |
| 2 | XO[2] = $C_{I1} * C_P$ |
| 3 | XO[3] = $C_{I2} * C_P$ |
| ... | |
| n | XO[n] = $C_{In} * C_P$ |

Figure 10:
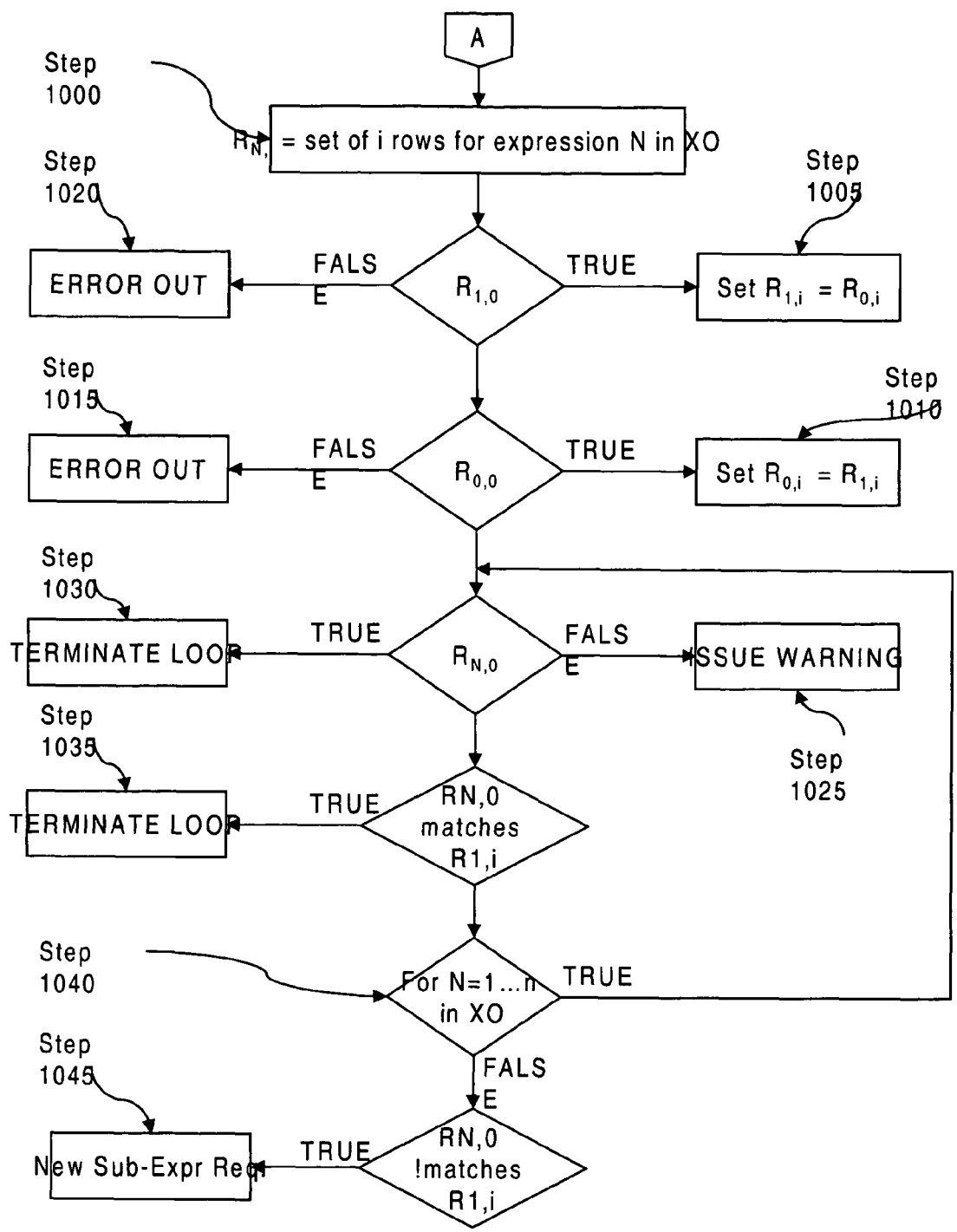
FIG. 10 is a continued flow chart of a matching algorithm as disclosed in the preferred embodiment.

Referring now to FIG. 10, let $R_{N,i}$ be the set of i rows (prime implicants) for expression N in XO (Step 1000). $R_{N,i}$ represents the complete set of prime implicants of expression N in XO. If $R_{1,0}$ (the first CAD expression row) indicates TRUE (see Table 6 for how TRUE is indicated), set $R_{1,i}$ to be identical to $R_{0,i}$ (Part Usage condition rows) (Step 1005). If $R_{0,0}$ (the first Part Usage expression row) indicates TRUE, set $R_{0,i}$ to be identical to $R_{1,i}$ (CAD expression rows) (Step 1010). If $R_{0,0}$ (the first part usage expression row) indicates FALSE, error out (unsatisfiable part usage condition) (Step 1015). Else if $R_{1,0}$ (the first CAD expression row) indicates FALSE, error out (unsatisfiable CAD variant condition, or no overlap with the part usage condition) (Step 1020).

Otherwise, if $R_{N,0}$ (the first sub-expression row) indicates FALSE, a warning is issued and the sub-expression is ignored (a sub-expression may become unsatisfiable, or FALSE, if the part usage condition is changed without reconciling its set of existing sub-expressions) (Step 1025). Else if $R_{N,0}$ (the first sub-expression row) indicates TRUE, the CAD occurrence row is marked as matched and the current sub-expression N is added to the list of matched sub-expressions thereby terminating the loop (Step 1030). Else, if the set of rows (prime implicants) $R_{N,i}$ exactly matches the set of rows in $R_{1,i}$, the CAD Occurrence is marked as matched and the sub-expression is added to the list of matched sub-expressions, because XO tables are normalized (and sorted), this can be achieved through a binary compare of the two sub-tables $R_{N,i}$ and $R_{1,i}$ (e.g. through ANSI memcmp( )), thereby terminating the loop (Step 1035). Step 1025 through Step 1035 loop over all row sets for expressions N=1 ... n in XO (Step 1040). Finally, if the CAD occurrence is not marked as matched this indicates that a new sub-expression is required, where the new sub-expression is the sum ("OR" combination) of the prime implicants $R_{1,i}$ (Step 1045).

CAD occurrences are repeatedly mapped to part usages. If the preferred embodiment determines that a previously matched CAD occurrence now maps to a different (or new) sub-expression the old link is released and the CAD occurrence is associated to the new sub-expression, and refreshes the mapping between CAD occurrences and part usages. Conversely, if a sub-expression looses the last link to a CAD occurrence, the sub-expression may be eliminated.

Application of Matching Algorithm to Tire Example

Figure 11:
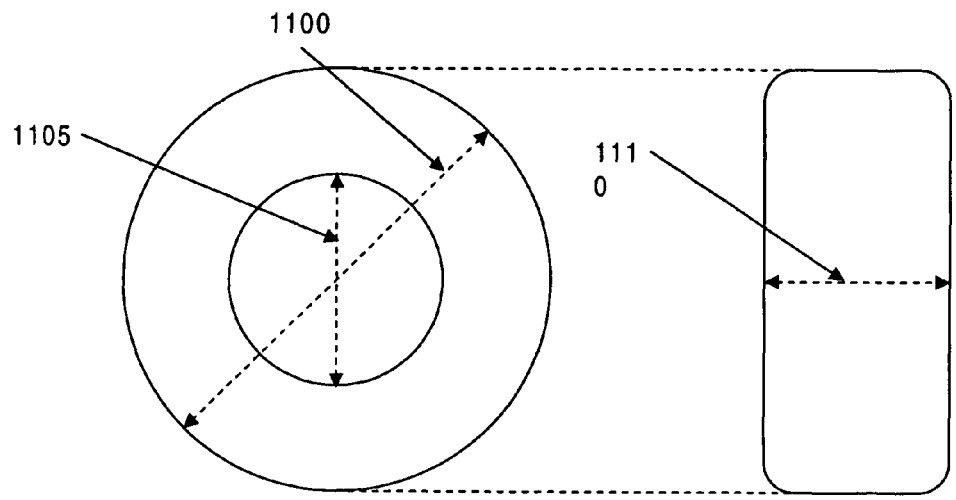
FIG. 11 is a CAD representation of a tire.
Figure 12:
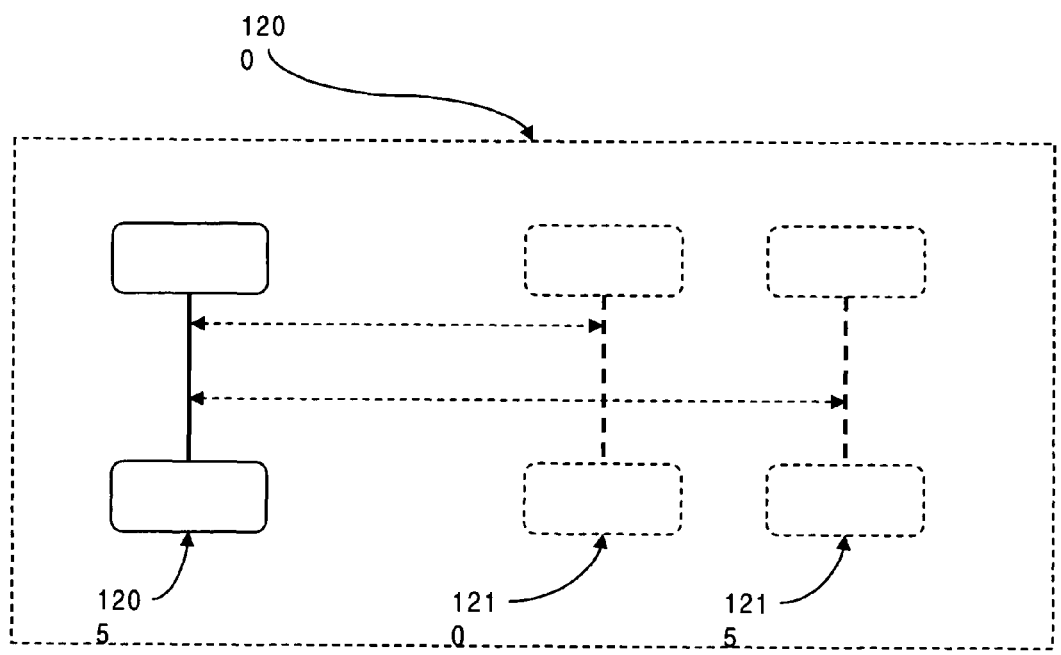
FIG. 12 is a positional/usage representation of multiple tires.

Turning to FIGS. 11 & 12, a tire design is characterized by a tire diameter 1100 ("TD"), a wheel rim diameter 1105 ("RD") and a width 1110 ("W"). Two designs exist for the same tire diameter, 589.2 mm, namely P-185/70 R13 and P-185/65 R14. A tire CAD product structure 1200 defines 6 road tire positions for each tire design, two for the front tires 1205, and two for the long wheel base 1210 and short wheel base 1215 (collectively referred to as wheel base, "WB") rear tires. Two tires are released for each design variant, depending on the maximum speed "V," and each part is released for the European and the US market "M," as summarized in Tables 3 & 4.

TABLE 3

Part Usage

| Condition | Part | TD | RD | W | V | M |
|---|---|---|---|---|---|---|
| C1 | P-185/70 R13 T | 589.2 mm | 330.2 mm | 185 mm | 190 km/h | US |
|  |  | 589.2 mm | 330.2 mm | 185 mm | 190 km/h | Europe |
| C2 | P-185/65 R14 T | 589.2 mm | 355.6 mm | 185 mm | 190 km/h | US |
|  |  | 589.2 mm | 355.6 mm | 185 mm | 190 km/h | Europe |
| C3 | P-185/70 R13 V | 589.2 mm | 330.2 mm | 185 mm | 240 km/h | US |
|  |  | 589.2 mm | 330.2 mm | 185 mm | 240 km/h | Europe |
| C4 | P-185/65 R14 V | 589.2 mm | 355.6 mm | 185 mm | 240 km/h | US |
|  |  | 589.2 mm | 355.6 mm | 185 mm | 240 km/h | Europe |

TABLE 4

CAD Solution

| Condition | Design in Position | TD | RD | W | WB |
|---|---|---|---|---|---|
| C5 | FL D-185/70 R13 | 589.2 mm | 330.2 mm | 185 mm | — |
| C6 | FR D-185/70 R13 | 589.2 mm | 330.2 mm | 185 mm | — |
| C7 | FL D-185/65 R14 | 589.2 mm | 355.6 mm | 185 mm | — |
| C8 | FR D-185/65 R14 | 589.2 mm | 355.6 mm | 185 mm | — |
| C9 | RL D-185/70 R13 | 589.2 mm | 330.2 mm | 185 mm | 2.980 mm |
| C10 | RR D-185/70 R13 | 589.2 mm | 330.2 mm | 185 mm | 2.980 mm |
| C11 | RL D-185/65 R14 | 589.2 mm | 355.6 mm | 185 mm | 2.980 mm |
| C12 | RR D-185/65 R14 | 589.2 mm | 355.6 mm | 185 mm | 2.980 mm |
| C13 | RL D-185/70 R13 | 589.2 mm | 330.2 mm | 185 mm | 3.065 mm |
| C14 | RR D-185/70 R13 | 589.2 mm | 330.2 mm | 185 mm | 3.065 mm |
| C15 | RL D-185/65 R14 | 589.2 mm | 355.6 mm | 185 mm | 3.065 mm |
| C16 | RR D-185/65 R14 | 589.2 mm | 355.6 mm | 185 mm | 3.065 mm |

In order to illustrate the presently preferred embodiment using the data from Tables 1 & 2, the presently preferred embodiment maps CAD solution FR D-185/65 R14 with part usage P-185/65 R14 T and P-185/70 R13 T, which when represented as a logical expression results in $C_{I1}$=C2*C8, and $C_{I2}$=C1*C8, respectively. The presently preferred embodiment calculates the following XO table according to the matching algorithm disclosed above; resulting in Table 5 for C2*C8.

TABLE 5

XO table for C2 * C8

| Comment | Flags | M = Europe | M = US | RD = 355.6 mm | TD = 589.2 mm | V = 190 km/h | W = 185 mm | WB = 2.980 mm |
|---|---|---|---|---|---|---|---|---|
| C2 | 00000001 | — | X | X | X | X | X | — |
|  | 00000000 | X | — | X | X | X | X | — |

TABLE 5-continued

XO table for C2 * C8

| Comment | Flags | M = Europe | M = US | RD = 355.6 mm | TD = 589.2 mm | V = 190 km/h | W = 185 mm | WB = 2.980 mm |
|---|---|---|---|---|---|---|---|---|
| $C_{f1}$ = | 00000001 | — | X | X | X | X | X | X |
| C2 * C8 | 00000000 | X | — | X | X | X | X | X |

And resulting in Table 6 for C1*C8:

TABLE 6

XO table for C1 * C8

| Comment | Flags | M = Europe | M = US | RD = 355.6 mm | RD = 330.2 mm | TD = 589.2 | V = 190 km/h | W = 185 mm | WB = 2.980 mm |
|---|---|---|---|---|---|---|---|---|---|
| C1 | 00000001 | — | X | X | — | X | X | X | — |
|  | 00000000 | X | — | X | — | X | X | X | — |
| $C_{f2}$ = C1 * C8 | 00000101 | — | — | — | — | — | — | — | — |

As illustrated in Table 6, C1 and C8 have conflicting values for the RD value so the row is cleared and the unsatisfiability flag is set. The unsatisfiability flag is detected resulting in the CAD occurrence not mapping to the part usage (Step 1015). For C1*C8, the algorithm detects the new sub-expression $C_{f1}$=C2*C8 that is necessary to link the CAD occurrence with the part usage.

Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment. Therefore, other implementations are within the scope of the following claims.

What is claimed is:

1. A method comprising the steps of:
   identifying a plurality of product representations by a data processing system, the product representations including optional product parts and quantities for a product to be manufactured;
   formulating a plurality of logical expressions from said plurality of product representations by the data processing system, the logical expressions corresponding to usage conditions that specify the optional product parts and quantities, the usage conditions each corresponding to a domain for which the product representations can be used; and
   aligning each of said plurality of logical expressions with a variance completeness and a consistency by the data processing system, the variance completeness describing all optional product parts and quantities specified by the plurality of representations and the consistency describing mismatches between optional product parts and quantities that correspond to different product representations.

2. The method of claim 1, wherein said plurality of product representations comprises a plurality of variant condition information corresponding to a particular domain.

3. The method of claim 1, wherein said variance completeness is a congruent product representation.

4. The method of claim 1, wherein said consistency is a non-empty intersection among a plurality of domain specific variances.

5. A method comprising the steps of:
   intersecting, by a data processing system, a plurality of variant expressions of product configuration data, each variant expression corresponding to a different product configuration according to a different use of the product configuration data;
   formulating a plurality of sub-expressions, by the data processing system, from the use of a plurality of bit arrays that represent a plurality of prime implicants of said intersection and a linked solution; and linking, by the data processing system, between said use of the product configuration data by said sub-expression for a same component in at least one different product representation; and aligning each of said plurality of variant expressions with a variance completeness and a consistency by the data processing system, the variance completeness describing all optional product parts and quantities specified by the product configuration data and the consistency describing mismatches between optional product parts and quantities that correspond to different product configuration.

6. A method comprising the steps of:

linking, by a data processing system, a plurality of domain solutions having a plurality of logical expressions from a component with a plurality of product representations, each domain solution indicating a product representation for a different use of product data;

intersecting said logical expressions by the data processing system to form a plurality of sub-expressions, wherein said sub-expressions map to said domain solutions; and determining an equivalence by the data processing system using bit arrays that represent the prime implicants of said intersection and said domain solutions; and aligning each of said plurality of logical expressions with a variance completeness and a consistency by the data processing system, the variance completeness describing all optional product parts and quantities specified by the plurality of representations and the consistency describing mismatches between optional product parts and quantities that correspond to different product representations, whereby said equivalence indicates alignment of said product representations.

7. A machine readable storage medium encoded with computer-executable instructions to perform a method, comprising:

instructions for identifying a plurality of product representations, the product representations including optional product parts and quantities for a product to be manufactured;

instructions for formulating a plurality of logical expressions from said plurality of product representations, the logical expressions corresponding to usage conditions that specify the optional product parts and quantities, the usage conditions each corresponding to a domain for which the product representations can be used; and instructions for aligning each of said plurality of logical expressions with a variance completeness and a consistency, the variance completeness describing all optional product parts and quantities specified by the plurality of representations and the consistency describing mismatches between optional product parts and quantities that correspond to different product representations.

8. The machine readable storage medium of claim 7, wherein said plurality of product representations comprises a plurality of variant condition information corresponding to a particular domain.

9. The machine readable storage medium of claim 7, wherein said variance completeness is a congruent product representation.

10. The machine readable storage medium of claim 7, wherein said consistency is a non-empty intersection among a plurality of domain specific variances.

11. A machine readable storage medium encoded with computer-executable instructions to perform a method, comprising:

instructions for intersecting a plurality of variant expressions of product configuration data, each variant expression corresponding to a different product configuration according to a different use of the product configuration data;

instructions for formulating a plurality of sub-expressions from the use of a plurality of bit arrays that represent a plurality of prime implicants of said intersection and a linked solution; and instructions for linking between said use of the product configuration data by said sub-expression for a same component in at least one different product representation; and instructions for aligning each of said plurality of variant expressions with a variance completeness and a consistency by the data processing system, the variance completeness describing all optional product parts and quantities specified by the product configuration data and the consistency describing mismatches between optional product parts and quantities that correspond to different product configuration.

12. A machine readable storage medium encoded with computer-executable instructions to perform a method, comprising:

instructions for linking a plurality of domain solutions having a plurality of logical expressions from a component with a plurality of product representations, each domain solution indicating a product representation for a different use of product data;

instructions for intersecting said logical expressions to form a plurality of sub-expressions, wherein said sub-expressions map to said domain solutions; and instructions for determining an equivalence using bit arrays that represent the prime implicants of said intersection and said domain solutions; and whereby said equivalence indicates alignment of said product representations.

13. A data processing system comprising a processor and accessible memory, the data processing system configured to implement a method to determine an alignment of product representations by performing the steps of:

identifying a plurality of product representations, the product representations including optional product parts and quantities for a product to be manufactured;

formulating a plurality of logical expressions from said plurality of product representations, the logical expressions corresponding to usage conditions that specify the optional product parts and quantities, the usage conditions each corresponding to a domain for which the product representations can be used; and aligning each of said plurality of logical expressions with a variance completeness and a consistency, the variance completeness describing all optional product parts and quantities specified by the plurality of representations and the consistency describing mismatches between optional product parts and quantities that correspond to different product representations.

14. A data processing system comprising a processor and accessible memory, the data processing system configured to implement a method to determine an alignment of product representations by performing the steps of:

intersecting a plurality of variant expressions of product configuration data, each variant expression corresponding to a different product configuration according to a different use of the product configuration data;

formulating a plurality of sub-expressions from the use of a plurality of bit arrays that represent a plurality of prime implicants of said intersection and a linked solution; and linking between said use of the product configuration data by said sub-expression for a same component in at least one different product representation; and aligning each of said plurality of variant expressions with a variance completeness and a consistency by the data processing system, the variance completeness describing all optional product parts and quantities specified by the product configuration data and the consistency describing mismatches between optional product parts and quantities that correspond to different product configuration.

15. A data processing system comprising a processor and accessible memory, the data processing system configured to implement a method to determine an alignment of product representations by performing the steps of:

linking a plurality of domain solutions having a plurality of logical expressions from a component with a plurality of product representations, each domain solution indicating a product representation for a different use of product data;

intersecting said logical expressions to form a plurality of sub-expressions, wherein said sub-expressions map to said domain solutions; and determining an equivalence using bit arrays that represent the prime implicants of said intersection and said domain solutions; and aligning each of said plurality of logical expressions with a variance completeness and a consistency by the data processing system, the variance completeness describing all optional product parts and quantities specified by the plurality of representations and the consistency describing mismatches between optional product parts and quantities that correspond to different product representations.

* * * * *